(12) United States Patent
Moser (10) Patent No.: US 8,770,976 B2
(45) Date of Patent: Jul. 8, 2014

(54) METHODS AND SYSTEMS FOR USE IN TRAINING ARMED PERSONNEL

(75) Inventor: Michael Moser, Chippendale (AU)

(73) Assignee: Marathno Robotics Pty Ltd, Eveleigh, New South Wales (AU)

( * ) Notice: Subject to any disclaimer, the term of this patent is extended or adjusted under 35 U.S.C. 154(b) by 0 days.

(21) Appl. No.: 13/393,591

(22) PCT Filed: Sep. 10, 2010

(86) PCT No.: PCT/AU2010/001165
§ 371 (c)(1),
(2), (4) Date: Mar. 1, 2012

(87) PCT Pub. No.: WO2011/035363
PCT Pub. Date: Mar. 31, 2011

(65) Prior Publication Data
US 2012/0171644 A1  Jul. 5, 2012

(30) Foreign Application Priority Data

Sep. 23, 2009 (AU) ................................ 2009904607

(51) Int. Cl.
*F41A 33/00* (2006.01)
(52) U.S. Cl.
USPC .............................................. 434/11; 434/27
(58) Field of Classification Search
USPC .................. 434/11–27; 703/8; 701/2, 22–28; 901/1–47; 700/245–254
See application file for complete search history.

(56) References Cited

U.S. PATENT DOCUMENTS

| 6,746,334 | B1 | 6/2004 | Barney |
| 2007/0105070 | A1* | 5/2007 | Trawick ......................... 434/11 |
| 2007/0204745 | A1 | 9/2007 | Son et al. |

FOREIGN PATENT DOCUMENTS

| CN | 201089161 Y | 7/2008 |
| EP | 0 676 612 A1 | 10/1995 |
| KR | 100797449 B1 | 1/2008 |
| WO | 98/40689 A1 | 9/1998 |

OTHER PUBLICATIONS

The first Segway soccer experience: towards peer to peer human-robot teams published by ACM 2006.
Obstacle Avoidance for the Segway Robotic Mobility Platform American Nuclear Society 10th International Conference on Robotics and Remote Systems for Hazardous Environments, Gainesville Florida Mar. 28-31, 2004.

* cited by examiner

*Primary Examiner* — Timothy A Musselman
(74) *Attorney, Agent, or Firm* — Davis & Bujold, PLLC; Michael J. Bujold (57) ABSTRACT

A system and method for use in training armed personnel are described. According to one embodiment, the system includes a number of autonomous mobile units and the units are arranged to perform actions in a training area to simulate participants in a firearms training exercise, and at least one of the mobile units is arranged to base at least some of its actions at least partially on the behavior of at least one human in the training area.

20 Claims, 7 Drawing Sheets

METHODS AND SYSTEMS FOR USE IN TRAINING ARMED PERSONNEL

This application is a National Stage completion of PCT/AU2010/001165 filed Sep. 10, 2010, which claims priority from Australian patent application serial no. 2009904607 filed Sep. 23, 2009.

TECHNICAL FIELD

The present invention relates to methods and systems for use in training armed personnel. The invention has particular application to training armed personnel by simulating combat situations in a built up environment.

BACKGROUND TO THE INVENTION

Armed personnel such as soldiers typically receive training to assist them in dealing with armed combat situations that they might encounter during their active duties. Such training can include training exercises using live ammunition such as practice in shooting at targets.

To date, such training has involved the use of static shooting targets, pop-up targets, and targets moved on rails. In some cases, mobile targets have been used in the form of a mannequin or the like mounted on a moveable platform on wheels. These may be radio-controlled by a human operator during a training exercise. In some cases, these mobile targets have been programmed to move about a pre-programmed route in a training area to simulate persons moving about, and the personnel being trained must attempt to hit the mannequins.

Such training is crucial to the personnel's performance and safety in real life situations. There remains a need for improved systems and methods for training armed personnel.

SUMMARY OF THE INVENTION

In a first aspect the present invention provides a system for use in training armed personnel including: a number of autonomous mobile units, the units being arranged to perform actions in a training area to simulate participants in a firearms training exercise; wherein at least one of the mobile units is arranged to base at least some of its actions at least partially on the behavior of at least one human in the training area.

The actions of the mobile units may include any of sounds produced by the mobile units, movements of the mobile units, deployment of special effects by the mobile units, changes in velocity or direction of the mobile units or mobile units remaining static.

The actions of each of the mobile units may be based on the subset of information that a human might be able to perceive, from the point of view of each respective mobile unit.

The behavior of the at least one human may include the position of the human, movements of the human, the velocity of the human, the acceleration of the human, the direction in which the human is facing, the posture of the human, sound produced by the human, gunfire of the human, the intention of the human or changes in these behaviors.

The movements may include movements on foot or in vehicles.

The system may further include at least one sensor for sensing the behavior of the at least one human.

The sensor may include any one of a thermal imaging sensor, an infrared beam, a laser curtain, a laser scanner, a camera, a motion sensor, a GPS device, a microphone, an array of microphones, a seismic sensor or radar.

At least one of the sensors may be mounted on a mobile unit.

Information relating to the current or expected behavior of the humans may be input to the system by a human operator.

In a second aspect the invention provides a method of training armed personnel including the steps of: providing a number of autonomous mobile units to perform actions in a training area to simulate participants in a firearms training exercise; wherein at least one of the mobile units bases at least some of its actions at least partially on the behavior of at least one human in the training area.

In a third aspect the present invention provides an autonomous mobile unit for use in training armed personnel including: the unit being arranged to perform actions in a training area to simulate a participant in a firearms training exercise; the mobile unit is arranged to base at least some of its actions at least partially on the behavior of at least one human in the training area.

In this specification, "behavior" is intended to include any or all of a person's position, actions, movements, posture, facing direction, gunfiring activity, intentions, velocity, or acceleration and also includes changes in these behaviors.

BRIEF DESCRIPTION OF THE DRAWINGS

An embodiment of the present invention will now be described, by way of example only, with reference to the accompanying drawings, in which.

DETAILED DESCRIPTION OF EMBODIMENTS

Figure 1:
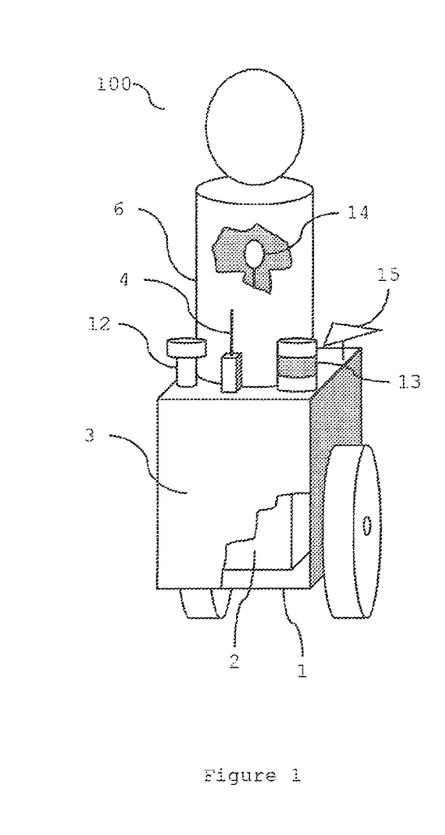
FIG. 1 is a schematic representation of a human-shaped robot used in embodiments of the invention.

Referring to FIG. 1, an embodiment of a mobile unit is shown in the form of human-shaped robot 100. Robot 100 has a motorized wheeled base 1 such as the Segway Robotic Mobility Platform available from www.segway.com. On the base 1 is mounted a mannequin 6 shaped like a human torso. Robot 100 is controlled by an on board computer 2 configured with software which is mounted on the base 1 and protected by an armored cover 3 from bullet strikes. Before use in a training area, robot 100 is pre-configured with map information relating to the training area. Robot 100 includes wireless communication means 4 such as wifi to enable sending and receiving of information to and from other robots, or to and from a control base station (not shown). Robot 100 includes a GPS receiver 12 to determine its own position when outdoors.

Robot 100 includes a laser rangefinder 13 to enable it to detect features in the local environment to thereby "see" around. The laser scans are used for several purposes: to improve position estimation outdoors, to enable position estimation indoors or in the absence of GPS, and to enable real-time obstacle avoidance. The laser scanner information is used for localization by comparing each laser scan to a map and deducing the robot's most likely position within the training area. Fixed and moving obstacles are detected by analyzing each laser scan. When an obstacle is detected in the robot's intended motion path, the motion plan is modified to safely navigate around it. Beyond the sensor range of the robot, the map information is used to calculate motion plans around known fixed obstacles.

The mannequin 6 of robot 100 houses a hit detection system 14 to detect when a bullet strikes the mannequin. Robot 100 also carries an acoustic gunshot detection system 15 which includes an array of microphones to detect and localize sources of gunfire.

Figure 2:
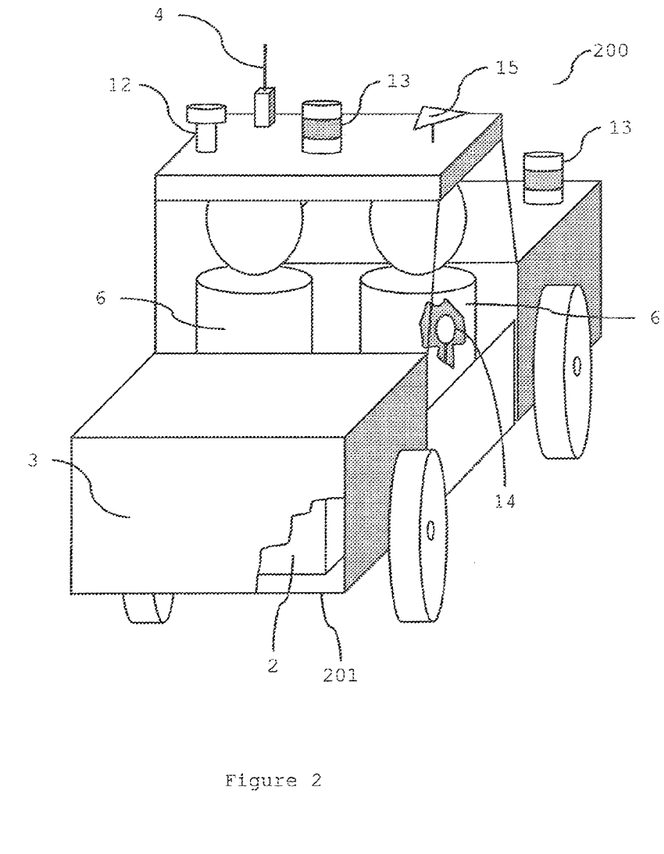
FIG. 2 is a schematic view of a vehicle-shaped robot used in embodiments of the invention.

Referring to FIG. 2, an alternative style of robot is shown in the form of a vehicular robot 200. This robot includes a four wheeled base 201. Two mannequins 6 are mounted inside the robot 200. In other respects, robot 200 is the same as robot 100 and like reference numerals have been used to indicate like features to those in FIG. 1.

FIGS. 3 to 8 depict firearms training exercises being carried out in a training area using the robots 100, 200 of FIGS. 1 and 2. In the figures, the roles of participants are shown using standard military notation (but without use of colors) as follows:

(blue) rectangle—Friendly, i.e. blue force
(red) diamond—Enemy, i.e. red force, or opposing force
(green) square—Neutral, i.e. green force The symbols for robotic participants convey the following information:

1. The mannequin position and the role it plays in the training exercise: red or green force (see symbols above). After a bullet strikes a mannequin, the symbol is covered by a cross.

2. The mobile base: human-sized base carries a single mannequin, a car-sized base carries multiple. The orientation of the mobile base is indicated by a pointed front. When the mobile base is in motion its velocity vector is shown as an arrow.

A small base symbol without a mannequin indicates a static sensor placed within the training area.

Figure 3:
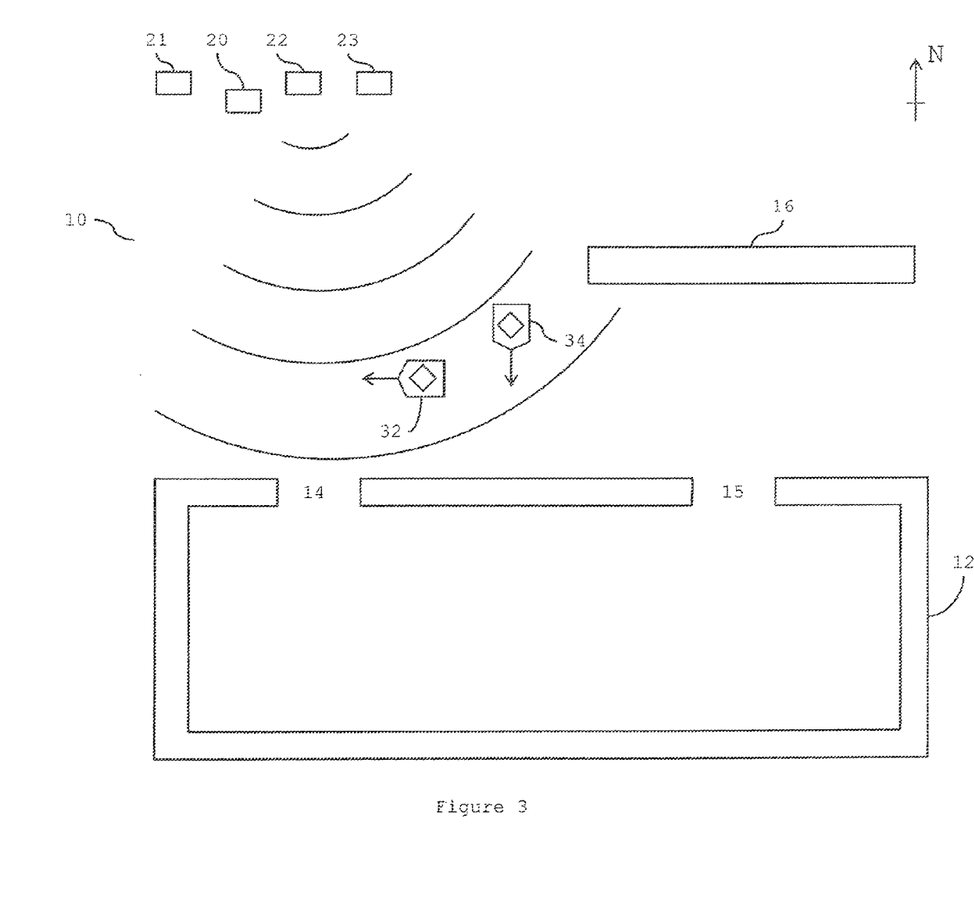
FIG. 3 is a schematic bird's eye view of a training area in which a training exercise is taking place.

Referring to FIG. 3, a training area is shown 10 in which is located a building 12 with doorways 14, 15, and a high wall 16. At the edge of the training area are four humans being armed personnel 20, 21, 22, 23 who are taking part in a firearms training exercise. In the training area are two mobile units in the form of human-shaped robots 32 & 34. These robots 32, 34 are of the type of robot 100 shown in FIG. 1. The robots are arranged to perform actions based on certain behaviors of human participants in the training exercise as will now be described.

For the purpose of the training exercise, the armed personnel 20, 21, 22 & 23 are the "blue" force (friendly), and the robots 32, 34 are the "red" force (enemy). In this exercise, it is imagined that the red force has occupied the training area; the blue force must clear the area of red force.

In FIG. 3, the armed personnel 20, 21, 22, 23 are observing the training area from ground cover at the edge of the training area. They can see robots 32, 34 performing sentry patrols in the area in front of building 12. Robot 32 is moving in a westerly direction and robot 34 is moving in a southerly direction. Armed person 22 takes aim at robot 34 with a rifle and lets off a shot. The bullet misses the robot but the sound waves created by the shot are picked up by the microphone arrays of robots 32, 34. Based on ongoing analysis of the outputs of each microphone array, the onboard computers on each of the robots determine that a shot has been fired, and each make an estimation of the direction from which the shot emanated, in this case, from the north.

Figure 4:
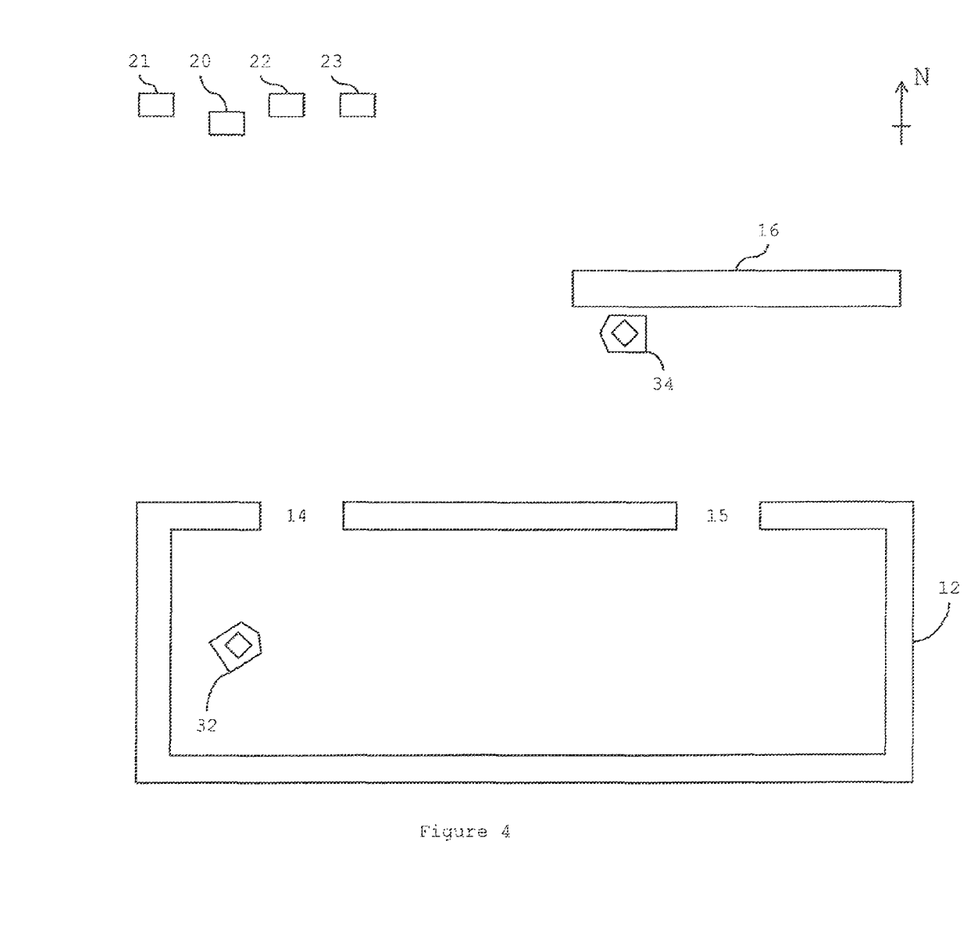
FIG. 4 shows further progress in the training exercise of FIG. 3.

Referring to FIG. 4, the robots 32, 34 now act on the basis that enemy personnel are situated to the north. Robot 34 moves to the nearest cover, behind wall 16. Robot 34 faces to the west, expecting that the armed personnel might approach from the north. Robot 32 retreats to take cover inside building 12. Robot 32 faces towards the inside of doorway 14, expecting that the armed personnel might soon enter the doorway.

Figure 5:
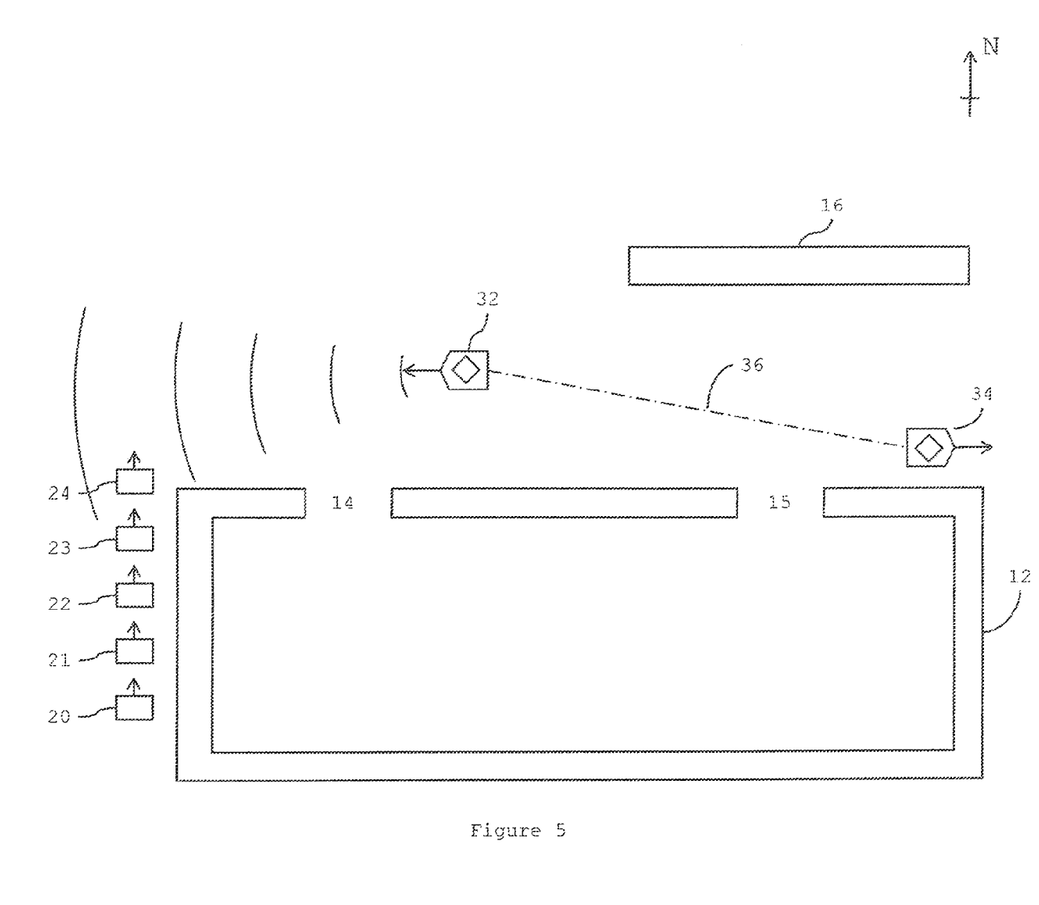
FIG. 5 is a schematic bird's eye view of the training area of FIG. 3 wherein another training exercise is taking place.
Figure 6:
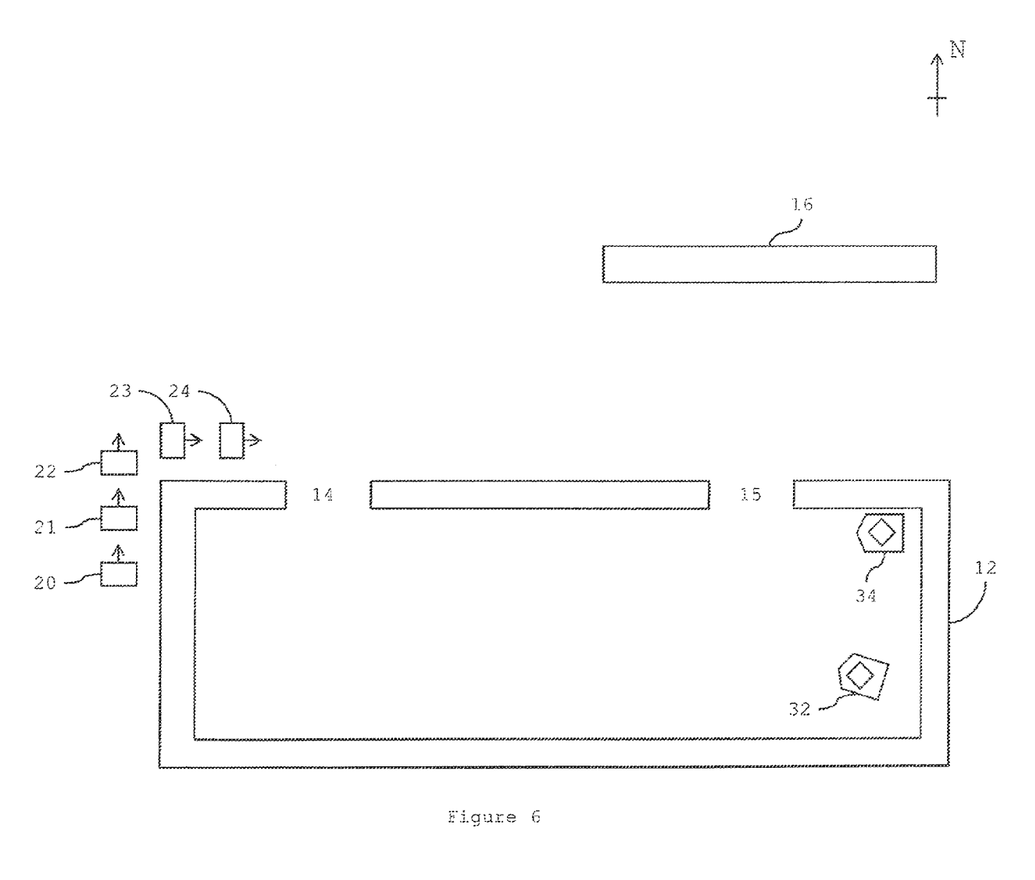
FIG. 6 shows further progress in the training exercise of FIG. 5.

Referring to FIGS. 5 & 6, another scenario is illustrated. This time, robots 32 and 34 are again performing sentry patrols outside of building 12. A column of five armed personnel 24, 23, 22, 21, 20 approach from the rear of building 12. Based on the continuous analysis of the output of the laser rangefinder mounted on robot 32, the onboard computer determines that an object has moved out from the side of building 12. Robot 32 thus proceeds on the basis that an enemy person has been detected. Robot 32 communicates wirelessly 36 with robot 34 to inform robot 34 that an enemy person has been detected emerging from around the side of building 12.

Referring to FIG. 6, robots 32 and 34 now act based on the detection of the armed person 24. Robot 32 has entered building 12 through the nearest doorway 14. Robot 34 has entered building 12 through its nearest doorway 15. Both of robots 32, 34 stand guard in an ambush formation inside building 12 in the expectation that armed personnel might enter through doorways 14 or 15. When the armed personnel enter building 12, the robots will simulate loud human speech, charge towards the armed personnel, and deploy pyrotechnic devices simulating explosions.

Figure 7:
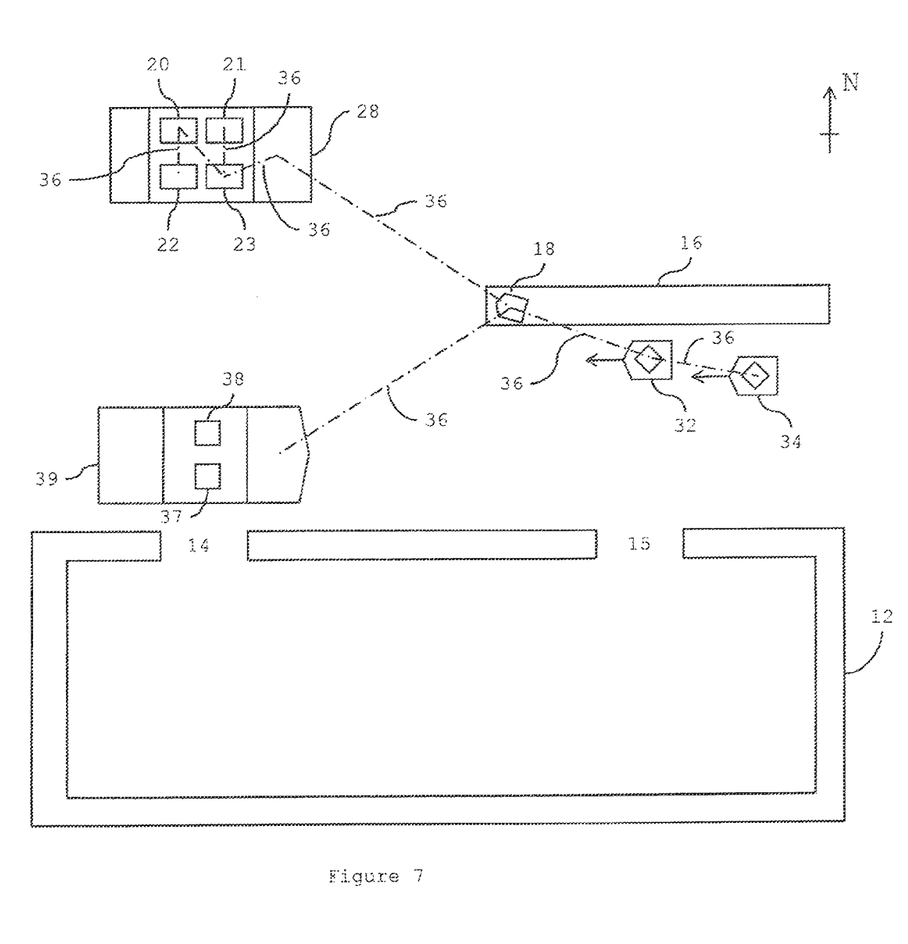
FIG. 7 is a schematic bird's eye view of the training area of FIG. 3 wherein yet another training exercise is taking place.
Figure 8:
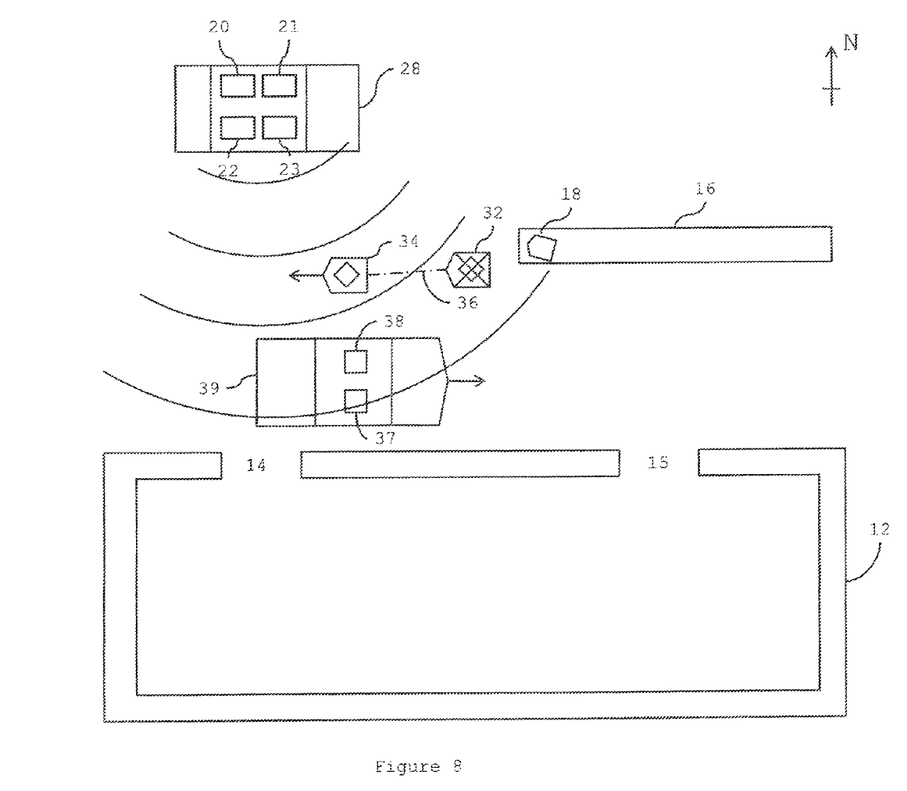
FIG. 8 shows further progress in the training exercise of FIG. 7.

Referring to FIGS. 7 & 8, another scenario is illustrated. This time, robots 32 and 34 are again performing sentry patrols outside of building 12. Four armed personnel 20, 21, 22, 23 are positioned inside a military vehicle 28 parked at the edge of the training area. The vehicle 28 and the armed personnel 20, 21, 22, 23 are equipped with GPS positioning devices to determine their own positions within the training area. They are also equipped with communication means to enable them to send and receive information to and from robots, or to and from a control base station. A vehicular robot 39 of the type labeled 200 in FIG. 2 is parked adjacent the northern exterior wall of building 12. Two mannequins 37, 38 are located inside vehicular robot 39. For the purposes of this exercise the mannequins 37, 38 are "green" force (neutral). On the top of the high wall 16 there is a stationary movement sensor 18 capable of detecting and locating armed personnel and their vehicles. Robots 32, 34 moving along the southern edge of the high wall 16 cannot see the vehicle 28 but they are aware of its presence and location from the information received over wireless 36 from static sensor 18, robotic car 39, the positioning device of military vehicle 28, and the positioning devices on armed personnel 20, 21, 22, 23. However, robots 32, 34 are configured to act based only on the information that a human might be able to perceive from their point of view.

Referring to FIG. 8, the robots 32, 34 continue to act on the basis that no enemy personnel are present in the area. They move into the open area to the West from high wall 16 and come under fire from armed personnel 20, 21, 22, 23. Robot 32 detects a bullet striking its mannequin and stops. Robot 32 communicates wirelessly 36 with robot 34 to inform robot 34 that it was struck by enemy fire and is disabled. Robot 34 continues to move to the West. The sound waves created by the shot are picked up by the microphone array of robotic car 39. Based on ongoing analysis of the outputs of the microphone array, the onboard computer of the robotic car determines that a shot has been fired in the vicinity. The robotic car 39 decides to flee the scene and starts to move to the East. In this highly dynamic scenario the task of armed personnel 20, 21, 22, 23 is to hit the fleeing robot 34 while not hitting the neutral mannequins 37, 38.

In various scenarios, the robots might perform the following actions, or a combination of these actions:

1. Move faster or slower based on the proximity of opposing forces
2. Increase number of sentries when opposing forces are detected
3. Station more guards near areas where soldiers have been detected
4. Follow people
5. Disperse
6. Move towards or away from soldiers
7. Stay out of sight from windows or doorways which may be observed by soldiers
8. Stay close to windows or doorways to appear to be observing soldiers
9. Maintain line-of-sight to soldiers whilst remaining near cover
10. Hide from soldiers
11. Conduct counter-sniper drills based on locations of snipers
12. Set up an ambush for approaching soldiers
13. Assault a location containing enemy soldiers
14. Attempt to outflank an assaulting force.
15. Create audio effects from an onboard speaker
16. Create other effects such as simulated gunfire, pyrotechnics or explosions
17. Send commands to activate range actuators to open or close doors and blinds and the like.

The ability of the robots to maintain estimates of their own positions within the training area is important for their autonomous operation. In the embodiments described above, the robots 100, 200 carried laser rangefinders and GPS receivers to localize themselves relative to a map loaded into their computers. In other embodiments the robots may localize themselves by way of any of many methods described in the literature, e.g. tracking range and bearing to laser reflecting beacons, measuring signal strength of radio beacons, or detecting buried magnets.

Safe robot navigation within the training area in the presence of static and dynamic obstacles is also required for autonomous operation. In the embodiments described above, the robots 100, 200 carried laser rangefinders to sense objects and movements of objects in front of them. In other embodiments the robots may sense objects and movements of objects by way of other sensors such as cameras, radars or sonars. After the obstacles in the robot's vicinity are detected, one of many well known obstacle avoidance algorithms may be employed to calculate a safe motion plan which avoids collision with the obstacles.

To present realistic training scenarios, it is important that the targets' actions emulate those of a real opposing force. This requires that the targets appear to be making independent decisions based on how situations evolve. Embodiments of the system may select actions based on models of people or vehicles which they intend to emulate. A model describes how a person or a vehicle driven by a person behaves under different circumstances. One type of model described in the literature is a dynamic stochastic model. Such a model allows probability distributions over the states of people and vehicles to be propagated forward in time. It can be used to generate realistic behavior. Given (a) a known state of a robot now, (b) an estimate of the state of the environment, and (c) a model of the behavior the robot is trying to emulate, it is a simple matter to draw random samples from the model to decide how to act.

There are a number of approaches to developing a model. One is to interview experts (instructors and soldiers), to ask how blue/red/green forces are likely to respond in a variety of possible situations, and to build a model based on their answers. Another approach is to learn a model from data. Algorithms for learning models from data are described in the literature. One approach to data acquisition for model learning is to gather data from the human training participants, either during normal training or during special data-gathering exercises. Soldiers and vehicles can be tracked with a variety of remote sensors as described below. If remote tracking can be performed effectively, the data can be stored and used to learn models. Otherwise, soldiers may be instrumented with position tracking devices specifically for data-gathering exercises.

In the embodiments described above, the firearms training exercises were carried out using live ammunition. In other embodiments the ammunition used could be simunition (simulated ammunition) or the firearms may be replaced by or augmented with lasers and laser targets to simulate ammunition.

In the embodiments described above, the actions of the robots were based on the behavior of the armed human participants in the firearms exercise. In other embodiments, the actions of the robots may also be based on the behavior of unarmed human participants playing the role of neutral bystanders.

In the embodiments described above, the actions of the robots were based on the positions and motions of human participants, as well as the gunfire produced by the armed personnel. In other embodiments, the actions of the robots may be based on other information such as the number of participating humans, the types of weapons they carry, the formation in which they advance, the general intentions of the participants, the noises they are making, or whether or not the participants are aware of the robots' presence.

Position and motion are important aspects of human behavior. Estimating position and motion of people and vehicles within a training area is an instance of the more general target-tracking problem. The problem can be formulated as follows. There are a number of sensors and an unknown number of targets. The aim is to estimate the number of targets and their state at all times, where the state of a target is a description including at least its position and possibly other variables such as discrete transportation modes (e.g. walking vs. running). A higher level model may include additional state variables, such as the target's intended destination. There are assumed to be models of the targets, e.g. statistical descriptions of how their state changes over time (e.g. how they move). There is assumed to be a model of each of the sensors, e.g. a statistical description of its reliability, including the likelihood of detecting a target, the likelihood of false-alarm (erroneously detecting a target), and the accuracy with which a target's position can be sensed. One strategy is to use probabilistic methods for combining all of this information into a consistent belief. This involves defining a probability distribution over the number of targets, and their state. The models of the targets are used to propagate the probability distribution forwards in time. The models of the sensors are used to modify the probability distribution based on the sensors' readings. The mechanics of managing the probability distributions and applying the models are well-studied and described in the literature on statistical estimation.

The simplest possible model includes only the positions of the people/vehicles. This is known as a constant-position model in the literature. Constant-position models evolve according to a random walk. The fidelity of the model can be improved by adding the velocities and possibly accelerations. In the target-training application at hand, this approach can be enhanced by having access to a map of the range. Motion models of people can be improved by using this map, constraining possible motion with obstacles such as walls. Motion of ground vehicles such as cars and trucks can be constrained further using kinodynamic models.

In the embodiments described above, the behavior of human participants in the firearms exercise was sensed remotely using laser rangefinders 13, microphone arrays 15, and GPS receivers mounted on the human participants 20, 21, 22, 23 and their vehicle 28. In other embodiments information about the behavior of human participants may be acquired by way of other sensors such as cameras, radars, sonars, motion detectors, pressure-sensitive floors or data entry by training instructors.

There are various approaches that can be used in camera based detection. For example, background subtraction is an effective means of identifying moving objects from a stationary camera. Specific to detecting human participants, there are many head- and face-detection algorithms described in the literature. There are many color-based or shape-based trackers for tracking targets after initialization. Infrared or thermal cameras can make use of similar algorithms, but the detection problem is simplified because humans are more obvious in these images. Stereo cameras can also simplify the problem by giving access to depth and, therefore, 3D shape information.

Laser scanners generally have insufficient resolution to identify humans by their shape. However, upright humans stand out in horizontal laser scans as foreground points, i.e. they look like slender vertical cylinders. These need to be differentiated from other cylindrical objects, such as trees and lamp-posts. One popular approach uses motion as the differentiator, i.e. humans are pole-like objects that move.

Acoustic signals can be distinctive cues for human activity. Simply looking for sound with amplitude above ambient can pick up loud humans. Frequency analysis can be more effective: the frequency components of a signal can be analyzed (e.g. using wavelet decomposition or the short-time Fourier-transform) and searched for patterns which do not match the ambient signal. Seismic sensors are essentially microphones tuned to low frequency ranges. Microphone arrays can be used to not only detect interesting noises, but to measure the direction to them. Sufficiently large (or multiple) arrays can be used to triangulate the positions of sound sources.

Low-precision sensors such as motion detectors, trip-sensors/beams, contact sensors mounted on doors and other entrances, pressure-sensitive floors, and light/laser curtains are all simple to process but do not provide an accurate picture of the location or number of humans. A map of the training area can be used to narrow down the location of the people based on knowledge of obstacles (such as walls) which obstruct the sensors line-of-sight.

The information collected by the robotic sensors may be augmented with information input into the system by human operators such as a training instructor. Such information could include, for instance, that training participants are expected to approach from a particular direction. Such information may be very valuable. For example, a training instructor has insights into the intended future behavior of the human participants (e.g. through knowledge of the training objectives or through direct observation) which otherwise would be very difficult for a robotic system to obtain. Note that the human input is not treated as a command, but rather as sensory information like that from any of the other sensors, leaving action selection to the robot.

In one of the embodiments described above, the actions of the robots were based on the information collected by sensor 18 positioned statically within the training area, sensors mounted on robots 100, 200, sensors mounted on human training participants 20, 21 and their vehicle 28. In other embodiments, the actions of the robots may be based on the behavior of humans sensed by way of sensors mounted on other mobile platforms such as aircraft or spacecraft flying above the training area.

In the embodiments described above, the actions of robots 32, 34 were based on the sensor information as well as the known layout of the training area and knowledge of military tactics. By fusing all of this information robots 32, 34 predicted that the armed personnel 20, 21, 22, 23, 24 were likely to enter building 12 through doorways 14 or 15. Prediction of future states is an example of inference. Inference is needed when direct observation of some states is impossible (e.g. human intentions, future states, human behavior in unobserved regions of the training area), or impractical (e.g. gaze direction of every participant), or inaccurate (e.g. precise positions of participants observed by imprecise sensors).

In one of the embodiments described above (see FIGS. 7 & 8), the belief of robot 32 about the state of the training scenario was based on the information collected by its own sensors and the information shared by another robot 34, a stationary sensor 18, the GPS receivers mounted on the human participants 20, 21, 22, 23 and their vehicle 28. In other embodiments the beliefs of robots and their actions may be based on the information collected and shared by any number of sensors distributed throughout the training area.

Operation of distributed systems presents certain challenges and opportunities. Physically, communication infrastructure of limited bandwidth can be provided using a combination of wired and wireless Ethernet, or similar technologies. Information can be sent across this infrastructure to build a common picture of the state of the training scenario and the behavior of all of the human participants. The amount of information shared by the robots is adjustable. At the one extreme is the case of no communication. Each robot in this case selects its actions based on the beliefs derived from the observations of its own sensors. On the other extreme is the case of all sensor platforms sharing all of their information. Each robot can then select its actions based on the positions of all robots and the beliefs derived from observations of all sensors in the system. By adjusting the amount of information exchanged by the sensor platforms, a desired trade off between belief quality and communication bandwidth can be achieved. A number of algorithms for combining information to form a consistent belief about the environment are described in the distributed data fusion literature.

In the embodiments described above, the actions of robots 32, 34 were based on the information which was reasonable for a human to have from the point of view of the robots. Due to the communication exchange between multiple sensing platforms the situation awareness of robots 32, 34 was in fact higher, i.e. the robots were aware of the presence of armed personnel despite the fact that they were located behind high wall 16. However based on their knowledge of the layout of the training area and a simplified model of human perceptual capabilities, the robots determined that a human's line-of-sight would be blocked by the high wall and hence the armed personnel would not be visible. If they had based their actions on the entirety of the information available to them, the robots would have chosen not to continue moving in the direction of the armed personnel.

This example illustrates the difficulty of achieving a challenging yet realistic firearms training utilizing a robotic system. On the one hand, the current state of the art in autonomous systems is vastly inferior to humans when it comes to perception, scene interpretation, and certain types of mobility. It is therefore desirable to provide a certain amount of extra information to the robots in order to compensate for their limitation and make training more challenging. On the other hand, the aim of the firearms training system is to give the impression of human-level perceptual ability and human-level ability to infer the intent of others, in order to produce a realistic training scenario. Therefore, sharing all information (from various parts of the training area) may impart knowledge to which a human would not have access.

In the embodiments described above, the appropriate level of situation awareness of the action selection engine was adjusted by first assembling global knowledge and then making decisions based on a subset of information as appropriate. In other embodiments a similar effect can be achieved by limiting the information flow between sensor platforms to prevent the appearance of omniscience.

In the embodiment described above, the armed personnel taking part in the training exercise were soldiers. Similarly, embodiments of the invention have application in training other types of people such as security guards, members of private military companies, law enforcement officers, and private citizens who may be members of a gun club or shooting academy.

Any reference to prior art contained herein is not to be taken as an admission that the information is common general knowledge, unless otherwise indicated.

Finally, it is to be appreciated that various alterations or additions may be made to the parts previously described without departing from the spirit or ambit of the present invention.

The invention claimed is:

1. A system for use in training armed personnel, the system comprising:
   a number of autonomous mobile units, the mobile units being arranged to to maintain estimates of their own positions within a pre-defined training area; each mobile unit being arranged to move autonomously about the training area under computer control, the autonomous movements of each mobile unit being at least partially based on the estimates of its own positions; and the mobile units being arranged to perform autonomous actions in the training area to simulate participants in a firearms training exercise;
   wherein at least one of the mobile units is arranged to autonomously base at least some of its actions at least partially on a sensed behavior of at least one human in the training area.

2. The system according to claim 1, wherein the actions of the mobile units include any of sounds produced by the mobile units, movements of the mobile units, deployment of special effects by the mobile units, changes in velocity or direction of the mobile units or mobile units remaining static.

3. The system according to claim 1, wherein the actions of each of the mobile units is based on the subset of information that a human might be able to perceive, from the point of view of each respective mobile unit.

4. The system according to claim 1, wherein the behaviour of the at least one human includes at least one of a position of the human, movements of the human, a velocity of the human, an acceleration of the human, a direction in which the human is facing, a posture of the human, sound produced by the human, gunfire of the human, an intention of the human or changes in these behaviors.

5. The system according to claim 4, wherein the movements of the human include movements on foot or in vehicles.

6. The system according to claim 1, further including at least one sensor for sensing the behavior of the at least one human.

7. The system according to claim 6, wherein the sensor includes any one of a thermal imaging sensor, an infrared beam, a laser curtain, a laser scanner, a camera, a motion sensor, a GPS device, a microphone, an array of microphones, a seismic sensor or a radar.

8. The system according to claim 6, wherein the at least one sensor is mounted on at least one of the mobile units.

9. The system according to claim 1, wherein information relating to a current or an expected behavior of the humans is input to the system by a human operator.

10. A method of training armed personnel, the method comprising the steps of:
    providing a number of autonomous mobile units,
    arranging the mobile units to maintain estimates of their own positions within a pre-defined training area,
    arranging the mobile units to move autonomously about the training area under computer control, and the movements of each of the mobile units being at least partially based on the estimates of its own position;
    arranging the mobile units to perform autonomous actions in the training area to simulate participants in a firearms training exercise; and
    arranging at least one of the mobile units to autonomously base at least some of its actions at least partially on a sensed behavior of at least one human in the training area.

11. The method of claim 10 further comprising the steps of:
    firing live ammunition at one of the mobile units, and
    autonomously physically moving the mobile units about the training area in response to the fired live ammunition.

12. An autonomous mobile unit for use in training armed personnel; the autonomous mobile unit being arranged to maintain estimates of its own position within a pre-defined training area;
    the mobile unit being arranged to move autonomously about the training area under computer control, and the movements of the mobile unit being at least partially based on the estimates of its own position;
    the mobile unit being arranged to perform autonomous actions in the training area to simulate a participant in a firearms training exercise; and
    the mobile unit being arranged to autonomously base at least some of its actions at least partially on a sensed behavior of at least one human in the training area.

13. The autonomous mobile unit of claim 12, wherein the mobile unit is designed to receive gunfire and continue to function during the firearms training exercise.

14. The autonomous mobile unit of claim 12, wherein the mobile unit includes at least two wheels and each mobile unit physically moves about the training area during the firearms training exercise.

15. The autonomous mobile unit of claim 12, wherein the mobile unit includes a bullet hit detection system that detects when a bullet strikes the mobile unit during the firearms training exercise.

16. The autonomous mobile unit of claim 12, further comprising a plurality of mobile units and each of the plurality of mobile units communicate with one another, move autonomously independent of one another, and track a relative movement of one another about the field during the firearms training exercise.

17. The autonomous mobile unit of claim 16, wherein an autonomous action of a first one of the plurality of mobile units impacts an autonomous action of a second one of the plurality of mobile units.

18. The autonomous mobile unit of claim 16, wherein at least a first of the plurality of mobile units interacts with at least a second of the plurality of mobile units as a friendly force and at least a third of the plurality of mobile units interacts as a hostile force.

19. The autonomous mobile unit of claim 18, wherein at least a fourth of the plurality of mobile units interacts as a neutral force.

20. The autonomous mobile unit of claim 12, wherein the mobile unit moves about in a wheeled vehicle, during the firearms training exercise, and includes at least one mannequin.

* * * * *